United States Patent
Singh et al.

(10) Patent No.: US 9,443,216 B2
(45) Date of Patent: Sep. 13, 2016

(54) SYSTEM AND METHOD FOR PROVIDING MANAGED INSTANT COMMUNICATION (OR CHAT)-BASED HELPDESK SERVICES

(75) Inventors: Amit Singh, Irving, TX (US); Minbao Li, Lewisville, TX (US); Dinyar Kavouspour, Plano, TX (US); Fari Ebrahimi, Basking Ridge, NJ (US); Tao Yang, The Colony, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1973 days.

(21) Appl. No.: 12/487,734

(22) Filed: Jun. 19, 2009

(65) Prior Publication Data

US 2010/0325216 A1    Dec. 23, 2010

(51) Int. Cl.
| | | |
|---|---|---|
| G06F 15/16 | (2006.01) |
| G06Q 10/06 | (2012.01) |
| G06Q 30/00 | (2012.01) |
| G06Q 30/02 | (2012.01) |
| H04L 12/58 | (2006.01) |
| H04M 3/523 | (2006.01) |
| G06Q 10/10 | (2012.01) |
| H04L 12/18 | (2006.01) |

(52) U.S. Cl.
CPC .......... *G06Q 10/0637* (2013.01); *G06Q 10/06* (2013.01); *G06Q 10/0633* (2013.01); *G06Q 10/0639* (2013.01); *G06Q 10/06393* (2013.01); *G06Q 30/016* (2013.01); *G06Q 30/02* (2013.01); *G06Q 10/103* (2013.01); *H04L 12/1813* (2013.01); *H04L 12/581* (2013.01); *H04L 51/04* (2013.01); *H04M 3/5232* (2013.01); *H04M 3/5233* (2013.01); *H04M 2203/401* (2013.01)

(58) Field of Classification Search
CPC ............... G06Q 30/016; G06Q 10/06; G06Q 10/0633; G06Q 10/0637; G06Q 10/0639; G06Q 10/103; H04M 3/5233; H04M 2203/401; H04M 3/5232; H04L 12/1813; H04L 12/581; H04L 51/04
USPC ........................................ 709/205, 227, 206
See application file for complete search history.

(56) References Cited

U.S. PATENT DOCUMENTS

| | | | | |
|---|---|---|---|---|
| 6,826,194 | B1* | 11/2004 | Vered ................... | H04M 3/5191 370/449 |
| 6,986,139 | B1* | 1/2006 | Kubo ........................... | 718/105 |
| 7,924,989 | B1* | 4/2011 | Cooper ................. | H04M 7/003 379/265.01 |
| 7,987,275 | B2* | 7/2011 | Shae .................... | H04L 12/1818 709/227 |
| 8,065,417 | B1* | 11/2011 | Richardson et al. ......... | 709/226 |
| 8,135,612 | B1* | 3/2012 | Scudder ................. | G06Q 10/02 705/37 |
| 8,379,830 | B1* | 2/2013 | Naik ..................... | H04M 3/493 379/265.02 |

(Continued)

OTHER PUBLICATIONS

Steiner, Ina; "Google Seller-Rating System a Threat to eBay?"; Aug. 1, 2006; ecommercebytes.com; pp. 1-2.*

*Primary Examiner* — Oleg Survillo

(57) ABSTRACT

An approach for managed instant communication (or chat)-based helpdesk services. An inquiry for a support service is received, at a helpdesk management platform, from a customer requesting assistance, the inquiry including one or more parameters defining the support service. A response is generated to the inquiry based on the one or more parameters, the response indicating a plurality of helpdesks associated with at least one service provider. An instant communication session is established between the customer and one of the helpdesks. The instant communication session is placed into a queue for an agent associated with the one helpdesk.

22 Claims, 15 Drawing Sheets

(56) References Cited

U.S. PATENT DOCUMENTS

| | | | |
|---|---|---|---|
| 2002/0082854 A1* | 6/2002 | Furuta et al. | 705/1 |
| 2003/0187672 A1* | 10/2003 | Gibson et al. | 705/1 |
| 2005/0213743 A1* | 9/2005 | Huet | G06Q 10/10 379/265.09 |
| 2006/0148512 A1* | 7/2006 | Ekholm et al. | 455/550.1 |
| 2006/0262920 A1* | 11/2006 | Conway | G10L 15/1822 379/265.02 |
| 2006/0262922 A1* | 11/2006 | Margulies | G06Q 30/02 379/265.12 |
| 2007/0208698 A1* | 9/2007 | Brindley | G06F 17/30474 |
| 2008/0007765 A1* | 1/2008 | Ogata et al. | 358/1.15 |
| 2008/0046269 A1* | 2/2008 | Lopez | G06Q 10/06 705/7.12 |
| 2008/0118052 A1* | 5/2008 | Houmaidi | H04M 3/5232 379/265.11 |
| 2008/0267117 A1* | 10/2008 | Stern | H04L 65/4084 370/329 |
| 2009/0110182 A1* | 4/2009 | Knight, Jr. | H04M 3/5233 379/265.12 |
| 2009/0180607 A1* | 7/2009 | Kamlet | H04M 3/5233 379/265.12 |
| 2010/0083183 A1* | 4/2010 | Yan | 715/843 |
| 2010/0121688 A1* | 5/2010 | Marsch | G06Q 10/0639 705/7.38 |
| 2010/0306153 A1* | 12/2010 | Mu | G06Q 30/02 706/47 |
| 2010/0316213 A1* | 12/2010 | Goel | G10L 15/22 379/265.09 |
| 2010/0324961 A1* | 12/2010 | Singh | G06Q 30/016 705/304 |
| 2011/0066938 A1* | 3/2011 | Nageswaram | G06Q 10/107 715/706 |

\* cited by examiner

SYSTEM AND METHOD FOR PROVIDING MANAGED INSTANT COMMUNICATION (OR CHAT)-BASED HELPDESK SERVICES

BACKGROUND INFORMATION

With the advent of computers, interactive electronic communications, and the Internet, as well as advances in the realm of digital information, has come a reinvention of conventional techniques for customer support and helpdesk services. Traditionally, customer support services have been facilitated through telephony call centers, whereby participants converse via voice communications in order to resolve customer issues. Unfortunately, these conventional approaches have proven to be inefficient and expensive, as they are typically constrained by legacy infrastructures and corresponding technologies. With readily available, cost-effective broadband services and reductions in cost of computing equipment, mobile devices, and the like, new more advanced techniques for customer support and helpdesk services are desired.

Furthermore, telecommunication service providers are finding it increasingly more challenging to leverage their existing resources. Yet, as increasing numbers of individuals migrate from the use of traditional communications based technologies to synergistic multimedia platforms, traditional telecommunications service providers are being challenged to develop new services and features in order to remain competitive, as well as develop fresh sources of revenue to support their aging infrastructures.

Therefore, there is a need for an approach that provides effective and convenient techniques for managed instant communication (or chat)-based helpdesk services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing managed instant communication (or chat)-based helpdesk services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to instant communication (or chat)-based applications, it is contemplated that exemplary embodiments have applicability to other equivalent applications.

Figure 1:
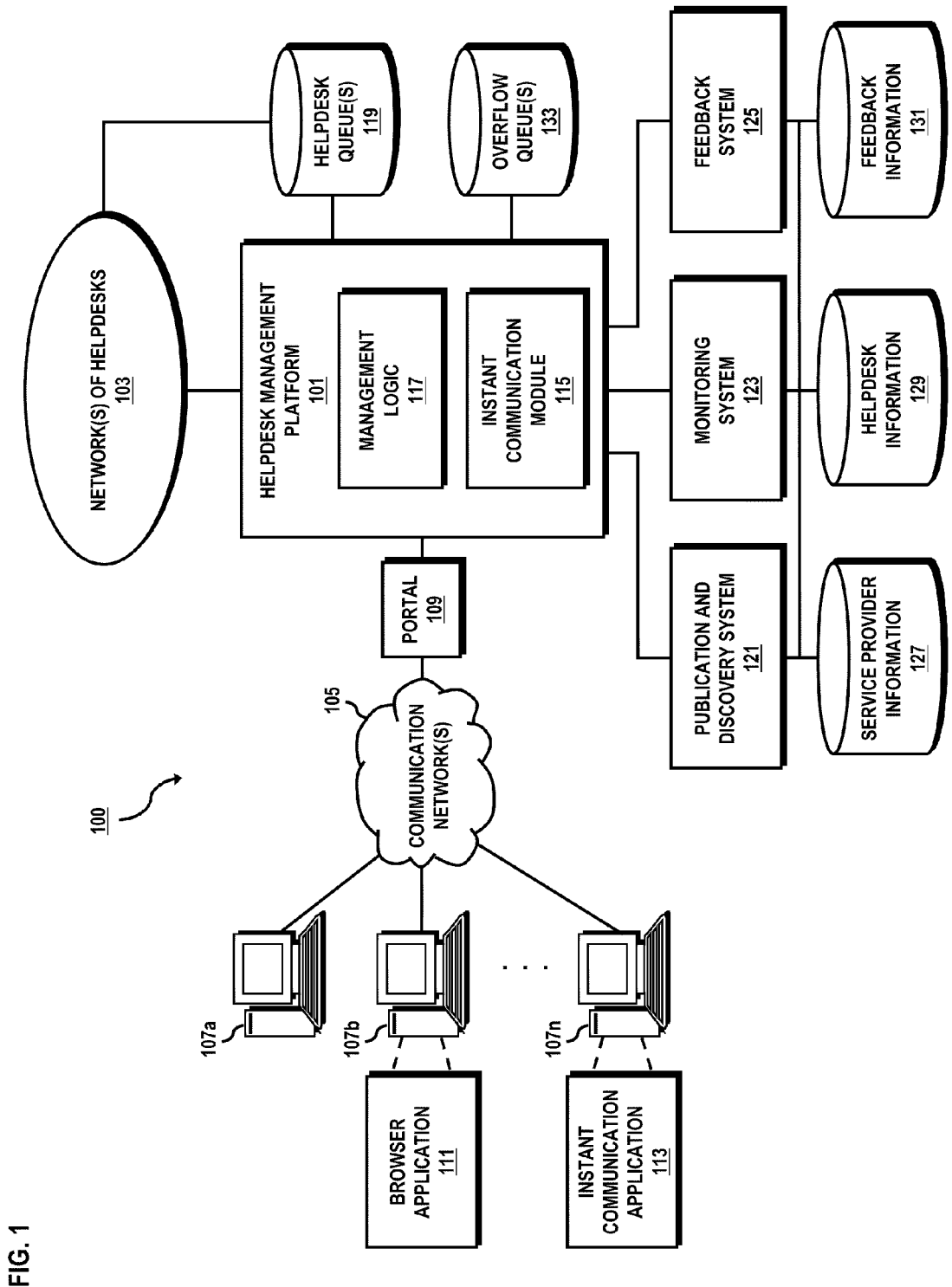
FIG. 1 is a diagram of a system capable of providing managed instant communication (or chat)-based helpdesk services, according to an exemplary embodiment.

FIG. 1 is a diagram of a system capable of providing managed instant communication (or chat)-based helpdesk services, according to an exemplary embodiment. For the purpose of illustration, system 100 is described with respect to helpdesk management platform 101 configured to manage, monitor, and operate one or more instant communication channels associated with one or more networks of helpdesks (or helpdesk networks) 103, as well as bridge particular ones of these helpdesks and users (e.g., customers, customer service agents, etc.) to these channels for providing instant communication-based customer support sessions over, for example, one or more communication networks 105. To this end, platform 101 is configured to enable service providers, via one or more user devices 107*a*, 107*b*, . . . , 107*n* to publish, advertise, and update supported helpdesk services that, in turn, enables customers via one or more user devices 107*a*-107*n* to inquire about (or otherwise search for) desired customer support services. In exemplary embodiments, one or more portals 109 (e.g., websites, networked applications, application programming interfaces, etc.) may be provided to enable service providers and users to access the features and functionality of platform 101 via, for instance, browser applications (e.g., browser application 111). It is noted that user devices 107*a*-107*n* may also be configured to execute instant communication (messaging or chat) applications (e.g., instant communication application 113) for communicating over communication network(s) 105 via the aforementioned instant communication channels. While specific reference will be made hereto, it is contemplated that system 100 may embody many forms and include multiple and/or alternative components and facilities.

It is recognized that providing high quality customer support is an integral part of many businesses, organizations, institutions, and the like (referred to as enterprises), that provide services, products, and information to various sectors (or markets), such as educational markets, production markets, supply markets, maintenance markets, financial markets, and the like. Typically, these enterprises go to great efforts trying to differentiate themselves, or otherwise gain competitive advantages, and unusually extend these efforts on the basis of customer support service alone. To this end, an enterprise will typically exhaust significant amounts of capital in order to provide increasingly higher levels of customer support, such as is in the case of customer support call centers. Namely, enterprises have traditionally sunk enormous amounts of money into legacy telephony systems in order to address customer needs via, for example, provisioning toll-free customer service telephone numbers for call centers so that customers can reach customer service representatives (or agents) when needed.

The convergence of legacy telephony and data communications within the telecommunications arena has enabled enterprises to realize certain cost-effective means for reaching customers, such as extending customer support in a variety of modes of communication, such as electronic mail, telephony calls, self-service portals, web pages, and the like. With the increasing popularity of the Internet, as well as instant communication, messaging, or chat-based applications, enterprises are beginning to seriously consider the potential advantages associated with the provisioning of chat-based customer support via live, virtual, and even mobile instant communication interfaces. With an increasing body of available customer support services and accompanying helpdesks that provide these customer support services, both customers and service providers alike are facing rather burdensome challenges associated with managing, monitoring, operating, publishing, searching, selecting, and supporting this ever growing population of helpdesks, as well as the communication channels, costs, and user experiences associated therewith. Moreover, conventional enterprises typically include many different branches, departments, subdivisions, and the like, each of which may implement one or more of their own helpdesks, making connecting customers to the most relevant, efficient helpdesk an even more onerous task.

It is noted that instant communication (or chat)-based customer support services are becoming more appealing to both customers and enterprises, largely due to the fact that chat-based sessions (and supporting infrastructures) are significantly less expensive for both parties as compared to corresponding telephony-based services. Even more so, customers tend to perceive the availability of instant communications as more effective. For example, customers generally feel as though they are able to access customer service agents more quickly.

Therefore, the approach of system 100, according to certain exemplary embodiments, stems from the recognition that extending chat-based customer support services through a managed helpdesk platform provides an effective and efficient technique for creating a network of helpdesks that may be associated with one or more service providers and, thereby, made available to customers in a seamless manner. That is, certain exemplary embodiments of system 100 enable service providers to register with the managed helpdesk platform, which is, in turn, configured to manage, monitor, operate, publish, and update the helpdesk(s) associated with the service provider(s). To this end, certain other exemplary embodiments of system 100 enable customers to discover (e.g., inquire about, search for, etc.) and be bridged to available ones of these helpdesk(s) that are, otherwise, considered "best suited" to address and solve the particularized issues of these customers.

By way of example, platform 101 may comprise computing hardware (such as described with respect to FIG. 11), as well as include (or have access to) one or more components or facilities configured to execute the processes described herein. According one embodiment, platform 101 may include or have access to portal 109, instant communication module 115, management logic 117, helpdesk queue(s) 119, publication and discovery system 121, monitoring system 123, and feedback system 125. It is contemplated, however, that platform 101 may embody many forms and include multiple and/or alternative components. For example, it is contemplated that the one or more of the aforementioned components or facilities may be combined, located in separate structures, and/or separate physical locations. In other words, a specific topology is not critical to embodiments of platform 101 or system 100.

In exemplary embodiments, platform 101 may execute one or more processes via, for example, management logic 117, for managing (or otherwise controlling) the establishment, bridging, transferring, and monitoring of instant communication sessions, as well as the queuing of these instant communication sessions in one or more helpdesk queues 119. It is noted that individual helpdesk queues 119 may be owned and operated by individual helpdesks of helpdesk network 103. To this effect, management logic 117 may also be configured to place instant communication sessions into one or more helpdesk queues 119, as well as share helpdesk queues 119 amongst one or more of the helpdesks associated with helpdesk network 103. When an instant communication session cannot be established, such as because a suitable helpdesk for resolving an issue of a customer does not exist or an instant communication session cannot be placed into an available helpdesk queue 119 because of, for example, system overloading, management logic 117 may be configured to notify the customer (e.g., via text message, electronic mail, telephony communication, etc.), as well as notify one or more administrators of platform 101. In this manner, the one or more administrators of platform 101 may efficiently deal with these issues, such as by registering additional helpdesks to helpdesk network 103, provisioning additional helpdesk queues (or overflow queues), etc.

Accordingly to exemplary embodiments, management logic 117 may provide one or more commands, directions, instructions, etc., to instant communication module 115 for establishing instant communication (or chat)-based sessions with one or more helpdesks based on various parameters, such as based on a business flow of a particular portal 109 from which a customer initiates a helpdesk query, questions answered by a customer during helpdesk inquiry processes, selection criteria, and the like. Establishment of instant communication sessions is examined in more detail in association with FIGS. 3 and 7. However, in any event, management logic 117 may provide one or more commands, directions, instructions, etc., to instant communication module 115 for instructing instant communication module 115 to queue instant communications sessions based on various logical definitions. For example, instant communication sessions may be queued based on one or more predefined (or dynamically defined) fixed or variable ratios that are directly proportional to a capacity of one or more of helpdesk queues 119. It is noted that queue capacity may be defined as a product between a total number of agents associated with a particular helpdesk and a number of instant communication sessions being concurrently (or simultaneously) handled by the total number of agents of the helpdesk. According to various other exemplary embodiments, management logic 117 may be configured to instruct instant communication module 115 to distribute (and, when necessary, redistribute) instant communication session between helpdesk queues 119. For instance, a particular helpdesk may become unavailable (or effectively unavailable) due to various factors, such as helpdesk scheduling (e.g., hours of operation), helpdesk queue capacity, agent availabilities, wait times associated with bridging instant communication sessions between customers and agents of the helpdesk, and/or any other suitable factors. As such, instant communication module 115 may be configured to, in response to one or more instructions provided by management logic 117, place instant communication sessions into one or more "overflow" queues 133. Namely, overflow queues 133 may be utilized by platform 101 to, in essence, queue helpdesk queues 119. In certain exemplary embodiments, overflow queues 133 may be ordered based on, for example, one or more priorities, such that instant communication sessions being overflowed into overflow queues 133 may be queued in association with one or more service level agreements corresponding to the customers and/or helpdesk service providers of system 100. As such, instant communication module 115, in conjunction with management logic 117, enables platform 101 to automate and dynamically place (or, when necessary, redistribute) instant communications session based on one or more of the aforementioned scenarios. According to various other embodiments, management logic 117 may be configured to instruct instant communication module 115 to enable various instant communication bridging operations, such as one or more transferring or conferencing operations between agents and/or helpdesks. It is noted that the execution of exemplary bridging operations are described in more with FIGS. 8-9C.

According to various embodiments, helpdesk management platform 101 may be implemented in one or more computing environments, including as a backend component (e.g., as a data server), as a middleware component (e.g., as an application server), as a front-end component (e.g., as a client computing device having a graphical user interface (GUI) or web-browsing application through which client computing devices can interact with a data server or application server), or as any combination thereof. Platform 101 may be interconnected by any form or medium capable of supporting data communication, such as one or more communication networks 105, e.g., a local area network (LAN), a metropolitan area network (MAN), a wide area network (WAN), the Internet, etc. Further, communication networks 105 may embody any telephony, packet-switched, or wireless network capable of transporting data and/or supporting instant communication (or chat)-based customer support sessions. As such, system 100 may embody a client-server environment, a master-slave environment, a peer-to-peer environment, or any other suitable environment. Although depicted as separate entities, communication network(s) 105 may be completely or partially integrated with network(s) of helpdesks 103. For example, communication networks 105 may include facilities to provide for transport of packet-based and/or telephony communications of the network(s) of helpdesks 103.

Figure 2:
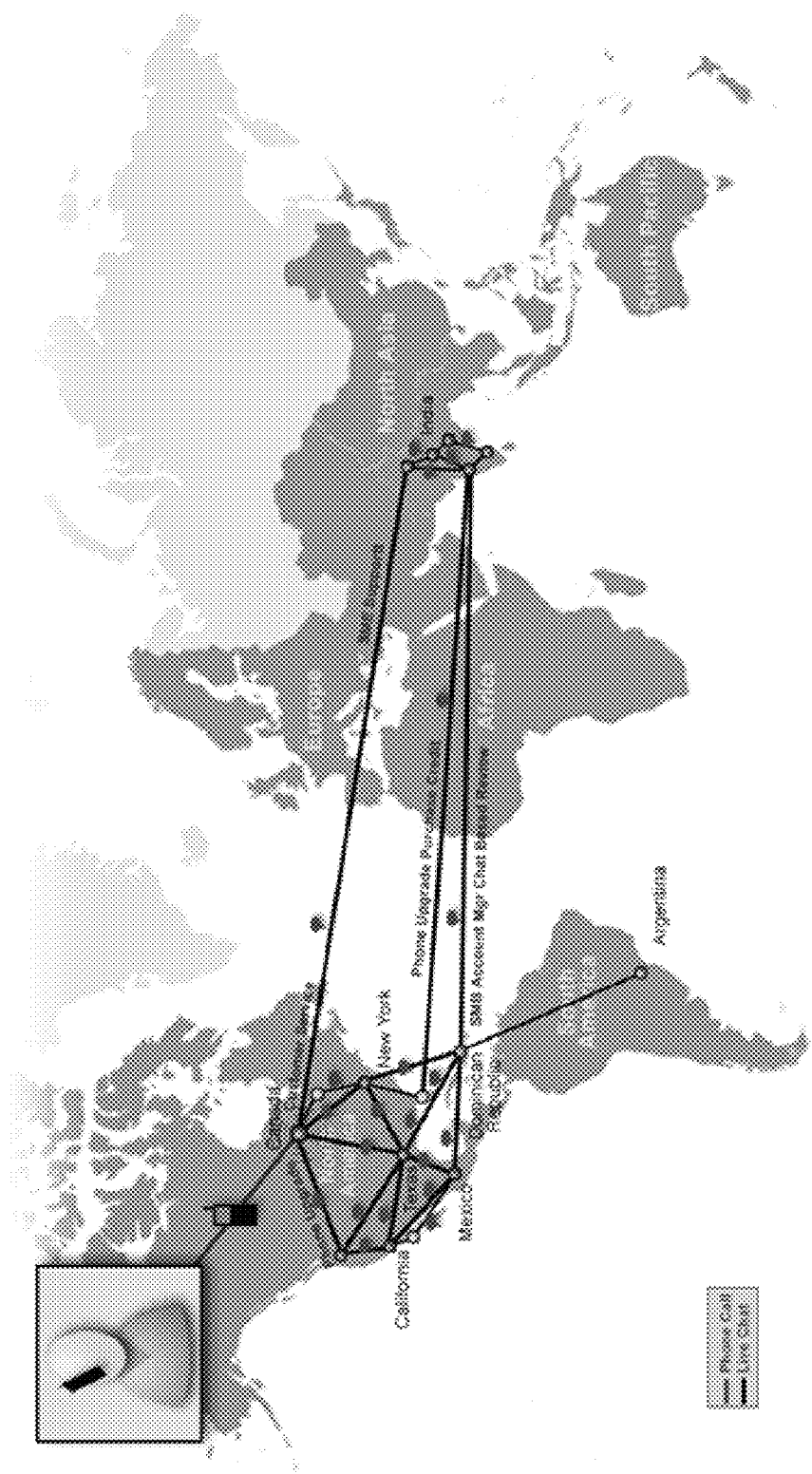
FIG. 2 is a diagram of a helpdesk network, according to an exemplary embodiment.

In exemplary embodiments, helpdesk networks 103 may be one or more physical and/or logical aggregations of helpdesks that may be associated with one or more service providers. To this end, the helpdesks of helpdesk networks 103 may provide customer support services associated with various markets (or submarkets), such as educational markets, production markets, supply markets, maintenance markets, financial markets, and the like. As such, the helpdesks of helpdesk networks 103 may be geographically dispersed across numerous geographical regions or other logical divisions, which is illustrated in FIG. 2. As such, helpdesk management platform 101 may be configured to aggregate, manage, monitor, operate, publish, and update the helpdesks of varying regions and divisions.

As shown in FIG. 1, platform 101 is implemented as a backend data server accessible to one or more user devices 107a-107n via one or more middleware application servers, e.g., portal 109. User devices 107a-107n may interact with portal 109 via communication network(s) 105 utilizing, for example, browser application 111. According to one embodiment, portal 109 acts as an enterprise web portal that provides a consistent "look and feel" for access control and helpdesk management operations. Such an architecture, while not necessary, enables user devices 107a-107n to be remotely dispersed (e.g., as by geography) from each other, as well as from platform 101, yet remain in collaboration with platform 101. Namely, portal 109 enables intelligent integration of and unified, real-time access to platform 101. To this end, it is noted that user devices 107a-107n may be associated with various types of users, such as service provider administrators, customer service support agents, and customers. As such, portal 109 may, according to various exemplary embodiments, provide one or more customized portlets (e.g., user interfaces and/or user interface components) arranged in one or more page layouts, which can be tailored to the various users, logical divisions (e.g., geographical regions, service providers, etc.), and/or helpdesks of helpdesk networks 103. Thus, the varied users of platform 101 can be provided common sets of web-based, or otherwise networked, applications to consistently and efficiently facilitate customer support services according to the classification (e.g., service provider administrator, agent, customer, etc.) of the users. In this manner, portal 109 may be employed by service provider administrators for registering with the managed instant communication (or chat)-based helpdesk services of system 100 via, for example, user devices 107a-107n. Administrators (and/or customer service agents) may also employ portal 109 for updating various forms of business information associated with one or more of their helpdesks, such as, for example, acceptable forms of customers (e.g., common customers, enterprise customers, etc.), categories of service (e.g., health, technology, finance, etc.), description of services, modes of communication (e.g., electronic mail, instant communication, live chat, virtual chat, mobile chat, telephony, etc.), guides for utilizing the customer support services associated with various helpdesks, rates of service (e.g., capacity of customers capable of being serviced), and scheduling (e.g., helpdesk hours of operation, agent hours, etc.), as well as any other suitable information. Customers may utilize portal 109, via user devices 107a-1097n, to inquire about (or otherwise search for) helpdesk services of helpdesk networks 103 that are seamlessly made available to customers via platform 101.

According to exemplary embodiments, system 100 includes publication system 121 for registering service providers to the managed instant communication-based services of system 100, as well as facilitating customer discovery of available ones of these helpdesk(s) that are, otherwise, considered "best suited" to address and solve the particularized issues of these customers. Thus, publication and discovery system 121 may communicate with platform 101 directly or via one or more networks, such as a corporate network (not illustrated) of the service provider of platform 101. It is also noted that system 121 may store the service provider information and/or helpdesk information associated with service provider registration processes to any suitable storage location or memory of (or accessible to) system 100, such as service provider repository 127 and helpdesk information repository 129. As such, system 121 may be configured to push (either automatically or in response to a request) various forms of service provider and/or helpdesk information to platform 101. In order to facilitate these communications, system 121 may include a communication interface (not shown) for transmitting information to platform 101, either "on-demand" or as the result of a predefined schedule, such as continuously or periodically. Exemplary processes for registering service providers and facilitating helpdesk discovery procedures are respectively described in accordance with FIGS. 5 and 6.

System 100 may also include monitoring system 123 for monitoring helpdesks of helpdesk network 103 and/or helpdesk queues 119 associated therewith. For example, system 123 may monitor the number of instant communication sessions being received by the helpdesks of helpdesk network 103, the number of instant communication sessions being handled by customer service agents, the number of bridging operations performed in connection with the helpdesks and/or agents, helpdesk and agent wait times, and/or simultaneous instant communication sessions being supported by helpdesks and/or agents, as well as any other suitable parameter, such as one or more metrics (e.g., bandwidth, congestion, throughput, latency, etc.) associated with service level agreements corresponding to the customers and/or helpdesk service providers of system 100, or any parameter associated with helpdesk network 103, such as network topology, quality of service, total number of subscribers, etc. According to various embodiments, monitoring system 123 may communicate with platform 101 directly or via one or more networks, such as a corporate network (not illustrated) of the service provider of platform 101. It is also noted that monitoring system 123 may store the aforementioned parameters, statistics, etc., in the form of helpdesk information to any suitable storage location or memory of (or accessible to) system 100, such as helpdesk information repository 129. To this end, monitoring system 123 may push (either automatically or in response to a request) certain helpdesk information to platform 101. As such, monitoring system 123 may include a communication interface (not shown) for transmitting helpdesk information to platform 101, either "on-demand" or as the result of a predefined schedule, such as continuously or periodically. An exemplary process for monitoring helpdesk network 103 is described in more detail in association with FIG. 7.

According to certain other exemplary embodiments, system 100 may also include feedback system 125 configured to gather feedback information (e.g., ratings, open-ended customer responses, survey responses, etc.) corresponding to customer satisfaction with the managed instant communication (or chat)-based helpdesk services of system 100, as well as customer satisfaction with individual helpdesks and/or customer service agents associated therewith. It is also noted that feedback information may be acquired from one or more of the helpdesk service providers, as well as gathered from one or more third-party sources. Still further, a service provider of platform 101 may also provide its own independent feedback information. In this manner, system 125 may communicate with platform 101 (and/or one or more third party sources (not shown)) either directly or via one or more networks, such as a corporate network (not illustrated) of the service provider of platform 101. It is also noted that feedback system 125 may store feedback information to any suitable storage location or memory of (or accessible to system 100), such as feedback information repository 131. To this end, system 125 may push (either automatically or in response to a request) certain feedback information to platform 101. As such, system 125 may include a communication interface (not shown) for transmitting feedback information to platform 101, either "on-demand" or as the result of a predefined schedule, such as continuously or periodically. An exemplary process for acquiring and implementing feedback information is described in more detail with FIG. 10.

To this end, platform 101 is configured to facilitate managed instant communication (or chat)-based helpdesk services over one or more communication networks 105. It is noted that communication networks 105 may be any suitable wireline, wireless, or combination thereof network. For example, communication networks 105 may include one or more telephony networks, such as a circuit-switched network, e.g., the public switched telephone network (PSTN), an integrated services digital network (ISDN), a private branch exchange (PBX), or other like network. Communication networks 105 may employ various wireless access technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE), wireless fidelity (WiFi), satellite, and the like. In other instances, communication networks may include a data network, such as any local area network (LAN), metropolitan area network (MAN), wide area network (WAN), the Internet, or any other suitable packet-switched network, such as a commercially owned, proprietary packet-switched network having voice over internet protocol (VoIP) capabilities, e.g., a proprietary cable or fiber-optic network. It is further contemplated that communication networks 105 may include components and facilities to provide for signaling and/or bearer communications between the various components or facilities of system 100. In this manner, communication networks 107 may embody or include portions of a signaling system 7 (SS7) network, or other suitable infrastructure to support control and signaling functions.

In exemplary embodiments, user devices 107a-107n may include any customer premise equipment (CPE) capable of sending and/or receiving one or more forms of the aforementioned modes of communication (e.g., chat-based communications, electronic mail communications, facsimile communications, telephony communications, etc.), as well as send and receive information associated with one or more of the processes or features described herein. For instance, user devices 107a-107n may include functionality for telephony-based communications, such as those functions employed by suitable plain old telephone service (POTS) devices, facsimile machines, and the like. user devices 107a-107n may employ mobile (or otherwise wireless) functions, such as included in cellular phones, radiophones, satellite phones, smart phones, wireless phones, or any other suitable mobile device, such as personal digital assistants (PDA), pocket personal computers, tablets, customized hardware, etc. Further, user devices 107a-107n may include computing device functions, such as implemented by any suitable computing device, e.g., VoIP phones, skinny client control protocol (SCCP) phones, session initiation protocol (SIP) phones, IP phones, personal computers, softphones, workstations, terminals, servers, and the like.

It is noted that user devices 107a-107n include one or more components for extending instant communications sessions to users (e.g., instant communication applications 113), as well as one or more browser applications (e.g., browser application 111) for accessing platform 101 and the features and functionalities thereof. It is contemplated, however, that browser applications 111 and/or instant communication applications 113 (or any other suitable client program) may be executed via platform 101 (e.g., via instant communication module 115) and, thereby, made accessible to users via user devices 107a-107n. In this way, browser applications 111 and/or instant communication applications 113 may provide one or more user interfaces, e.g., graphical user interfaces (GUI), configured to interact with the various services (or functions) of system 100. Exemplary GUIs are described in more detail in accordance with FIGS. 4A-4C and 9A-9C. Additionally (or alternatively), these or other GUI interfaces may be configured to facilitate the acquisitioning, exchanging, managing, sharing, storing, and updating of service provider information, helpdesk information, and feedback information, respectively stored to, for example, service provider information repository 127, helpdesk information repository 129, and feedback information repository 131. It is noted, however, that the service provider information, helpdesk information, and feedback information may be stored to any suitable storage location or memory of (or accessible to system 100), such as memories (not shown) of platform 101, user devices 107a-107n, portal 109, publication and discovery system 121, monitoring system 123, feedback system 125, etc.

According to various exemplary embodiments, repositories 127-131 may be maintained by a service provider of platform 101 and, thereby, of the managed instant communication-based helpdesk services of system 100 or by any suitable third-party. It is also contemplated that the physical implementation of repositories 127-131 may take on many forms, including, for example, portions of existing repositories of a service provider, new repositories of a service provider, third-party repositories, and/or shared-repositories. As such, repositories 127-131 may be configured for communication over system 100 (e.g., over one or more of communication networks 105) through any suitable messaging protocol, such as lightweight directory access protocol (LDAP), extensible markup language (XML), open database connectivity (ODBC), structured query language (SQL), Configuration Access Protocol (CAP) and the like, as well as combinations thereof. In those instances when repositories 127-131 are provided in a distributed fashions, information and content available via repositories 127-131 may be located utilizing any suitable querying technique, such as electronic number matching, distributed universal number discovery (DUNDi), uniform resource identifiers (URI), etc.

The operation of platform 101 and, thereby, of system 100, for providing the managed instant communication (or chat)-based helpdesk services are explained below.

Figure 3:
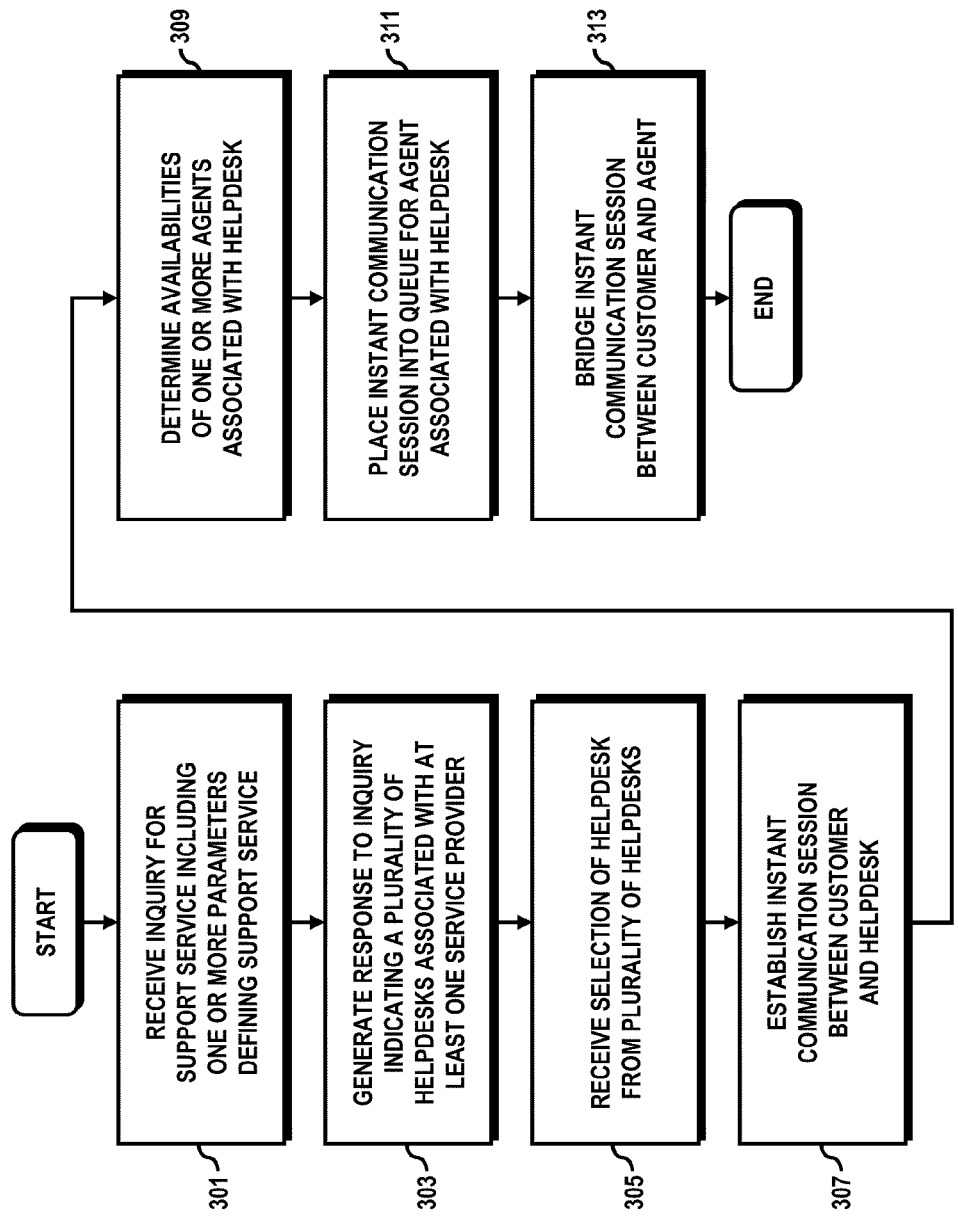
FIG. 3 is a flowchart of a process for providing instant communication (or chat)-based helpdesk services, according to an exemplary embodiment.
Figure 4A:
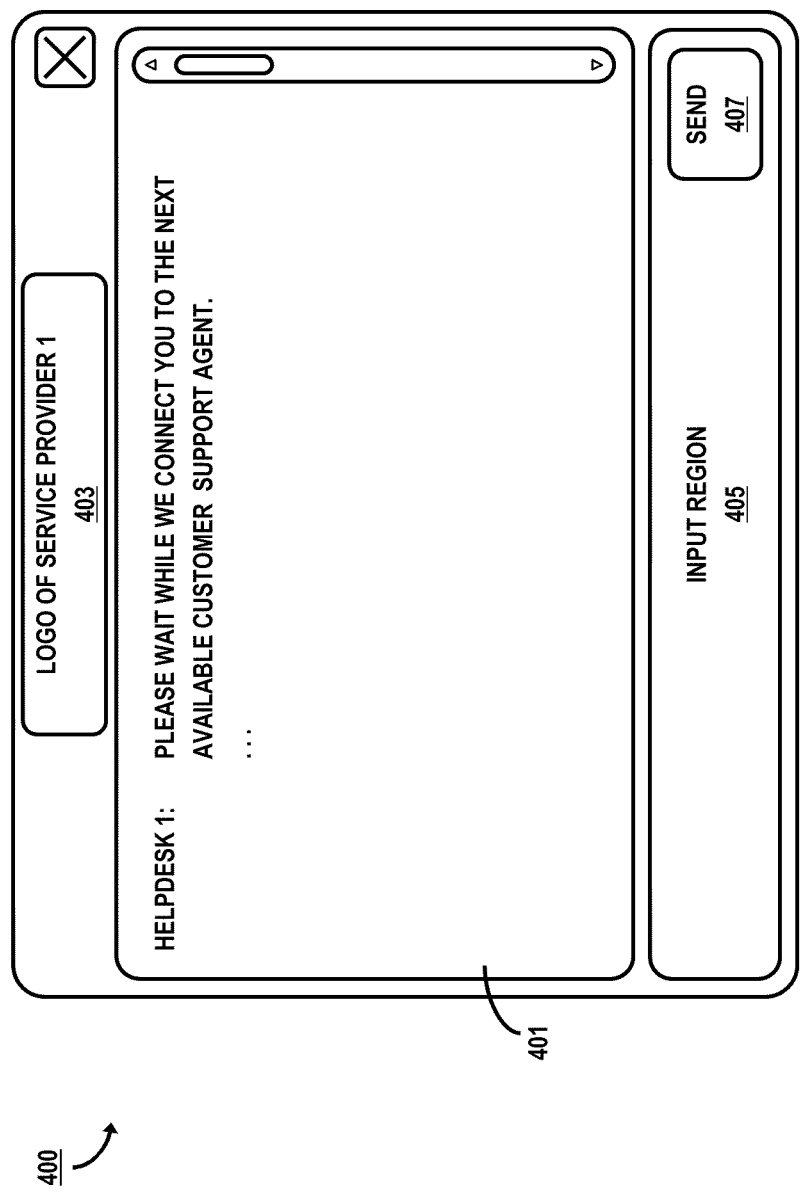
FIGS. 4A-4C are diagrams of graphical user interfaces for providing instant communication (or chat)-based user interfaces, according to exemplary embodiments.
Figure 4B:
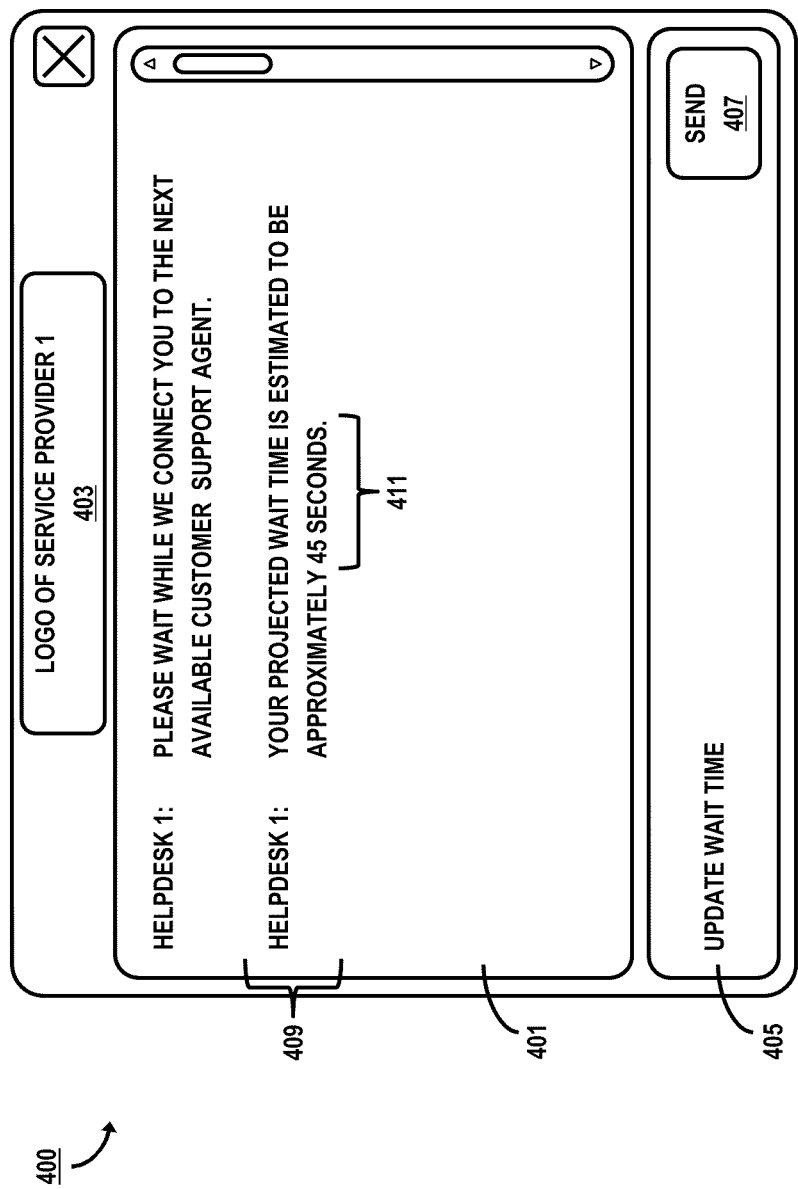
Figure 4C:
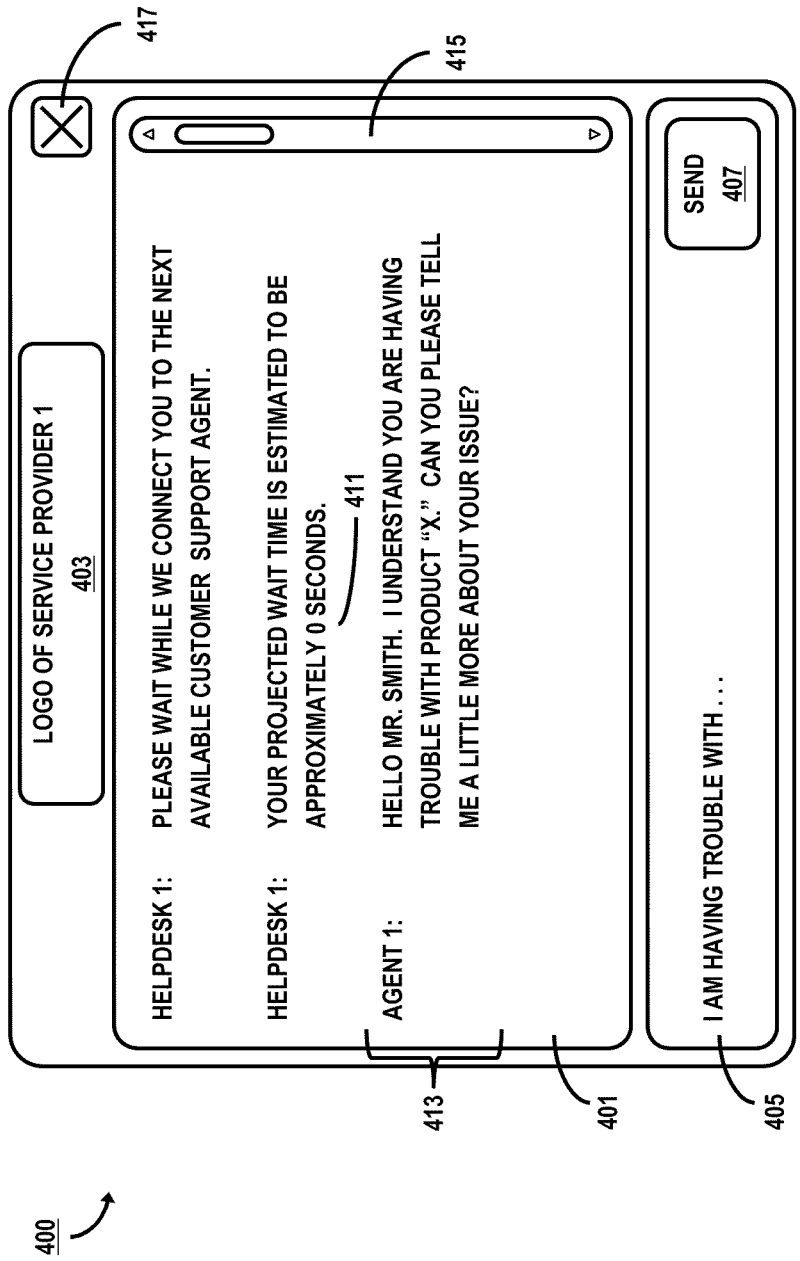

FIG. 3 is a flowchart of a process for providing instant communication (or chat)-based helpdesk services, according to an exemplary embodiment. FIGS. 4A-4C are exemplary diagrams of graphical user interfaces for providing instant communication (or chat)-based user interfaces. For illustrative purposes, the process is described with reference to FIG. 1, as well as FIGS. 4A-4C. It is also noted that the steps of the process may be performed in any suitable order, as well as combined or separated in any suitable manner. At step 301, helpdesk management platform 101 receives an inquiry for a support service from a customer requesting assistance. According to exemplary embodiments, the inquiry may include one or more parameters defining the support service being inquired about by the customer. For example, the parameter(s) may relate one or more keywords, customer feedback information (or threshold feedback information), helpdesk status (or threshold helpdesk status), threshold cost parameters, location (either of the helpdesks or corresponding to the customer), and/or any of the aforementioned business information associated with the helpdesks of helpdesk network 103 and, thereby, corresponding to the service provider(s) supporting the helpdesks. It is noted that customers may transmit inquiries to platform 101 by accessing (via, for example, browser application 113 of user devices 107a-107n) one or more portlets of portal 109 that are configured to enable the customers to formulate the inquiries using one or more user interface components, e.g., menus, buttons, options, inputs, etc. Once formulated, the inquiries may be transmitted to platform 101 by portal 109 and, thereby, ported to any suitable component or facility of platform 101. It is also contemplated that helpdesk management platform 101 may, in certain exemplary embodiments, implement portal 109 and, as such, inquiries may be directly ported to the suitable components or facilities of platform 101.

According to exemplary embodiments, formulated inquires may be supplied to publication and discovery system (or system) 121 for generating responses therefrom. Thus, in step 303, system 121 generates a response to the inquiry, which can be based on the one or more parameters provided by the customer. To this end, the response may indicate the particular helpdesks of helpdesk network 103 satisfying the parameter(s) specified by the customer. It is noted that the helpdesk(s) provided (e.g., listed) in the response may be associated with at least one service provider. Further, system 121 may, in certain exemplary embodiments, generate the response based on additional information, such as real-time status information (e.g., wait times, helpdesk availabilities, agent availabilities, and the like) corresponding to the multitude of helpdesks. As such, the response may be transmitted (or ported) to portal 109 for presentation to the customer via one or more of the aforementioned portlets. Accordingly, the customer may choose (or otherwise select) a helpdesk that they believe is "best" suited for resolving their support issue. Thus, at step 305, management logic 117 and/or instant communication module 115 receives, from the customer via portal 109, a selection of a particular helpdesk from the plurality of helpdesks of helpdesk network 103. Alternatively, management logic 117 and/or system 121 may select the particular helpdesk from the plurality of helpdesks based on the one or more parameters of the inquiry, as well as based on one or more predefined selection criteria, e.g., threshold values associated with, for instance, the real-time status information associated with the plurality of helpdesks.

In any event, platform 101 establishes, via instant communication module 115, an instant communication session between the customer and the selected helpdesk, per step 307. At this point, the one or more portlets of portal 109 may cause browser application 111 of a user device (e.g., user device 107n) to execute (or access) an instant communication application (e.g., instant communication application 113) for communicating with the selected helpdesk via, for instance, an instant communication (or chat)-based session. Referring momentarily to FIG. 4A, graphical user interface (GUI) 400 provides the customer with an instant communication (or chat)-based interface 401 that presents (e.g., displays) a text dialogue between the customer and the selected helpdesk, which in this example is "HELPDESK 1" associated with "SERVICE PROVIDER 1." Logo region 403 is provided so that the customer knows that they are connected to the support services of "SERVICE PROVIDER 1." Input region 405 enables the customer to input text to graphical user interface 400, which may be transmitted to a corresponding participant of the instant communication via send button 407. In this example, once the instant communication session is established, "HELPDESK 1" may prompt the customer to "PLEASE WAIT WHILE WE CONNECT YOU TO THE NEXT AVAILABLE CUSTOMER SUPPORT AGENT."

Referring back to FIG. 3, platform 101 determines, via management logic 117, one or more availabilities of the customer support agents (or agents) associated with the selected helpdesk based on, for example, presence information related to the agents, per step 309. The availabilities and/or the presence information may be retrieved from a presence service (not shown) that may be operated and maintained by a service provider of the managed instant communication (or chat)-based services of system 100 or by any suitable third-party provider. An exemplary model for presence and presence determination are respectively detailed in Internet Engineering Task Force (IETF) Request for Comments (RFC) 2778 and 2779, which are incorporated herein, by reference, in their entireties. An exemplary data format for conveying presence information, as well as extensions to that format for conveying rich presence information, are respectively detailed in IETF RFCs 3863 and 4480, which are incorporated herein, by reference, in their entireties. Based on the availabilities of the agents, the instant communication session may be placed, at step 311, into a helpdesk queue (e.g., helpdesk queue 119) for an agent associated with the selected helpdesk. In certain exemplary embodiments, instant communication module 115 may provide the customer, via an instant communication (e.g., message), with a projected wait time before an agent will be available to assist the customer with their support issue. Referring to FIG. 4B, GUI 400 illustrates "HELPDESK 1" prompting the customer with status message 409 that provides the customer with projected wait time 411. It is contemplated that projected wait time 411 may be updated in real-time, periodically, or in an on-demand fashion. According to certain embodiments, projected wait time 411 may be updated in an "on-demand" fashion by the customer messaging "HELPDESK 1" by inputting an "UPDATE WAIT TIME" message to input region 405 and transmitting the message to "HELPDESK 1" via send button 407. To this end, GUI 400 and status message 409 may be configured so that when updates to projected wait time 411 are provided, GUI 400 may simply update projected wait time 411 without reproducing the entirety of status message 409; however, it is contemplated that GUI 400 may be simply configured to reproduce status message 409 with an updated projected wait time 411.

Thus, monitoring system (or system) 123 may be configured to monitor the availability of the agent, such that when the agent becomes available (e.g., is capable of supporting the instant communication session either alone or simultaneously with one or more other instant communication sessions), instant communication module 115 may seamlessly bridge the instant communication session between the customer and the available agent, per step 313. In this manner, instant communication application 113 may remain connected to a same instant communication session and, thereby, executing a same GUI. Referring to FIG. 4C, GUI 400 illustrates that "AGENT 1" has been bridged into the instant communication session, such that "AGENT 1" may prompt the user with introductory message 413, e.g., "HELLO MR. SMITH. I UNDERSTAND YOU ARE HAVING TROUBLE WITH PRODUCT 'X.' CAN YOU PLEASE TELL ME A LITTLE MORE ABOUT YOUR ISSUE?" It is also noted that projected wait time 411 has been continuously or periodically updated to "0 SECONDS," also indicating that the available agent, i.e., "AGENT 1," has been bridged to the instant communication session. As such, the customer and the agent may converse via GUI 400 that, according to certain embodiments, may also include one or more navigation elements (e.g., scroll bar 415) for reviewing previous messages associated with the instant communication session, as well as include one or more user interface components for terminating the instant communication session, such as button 417.

Figure 5:
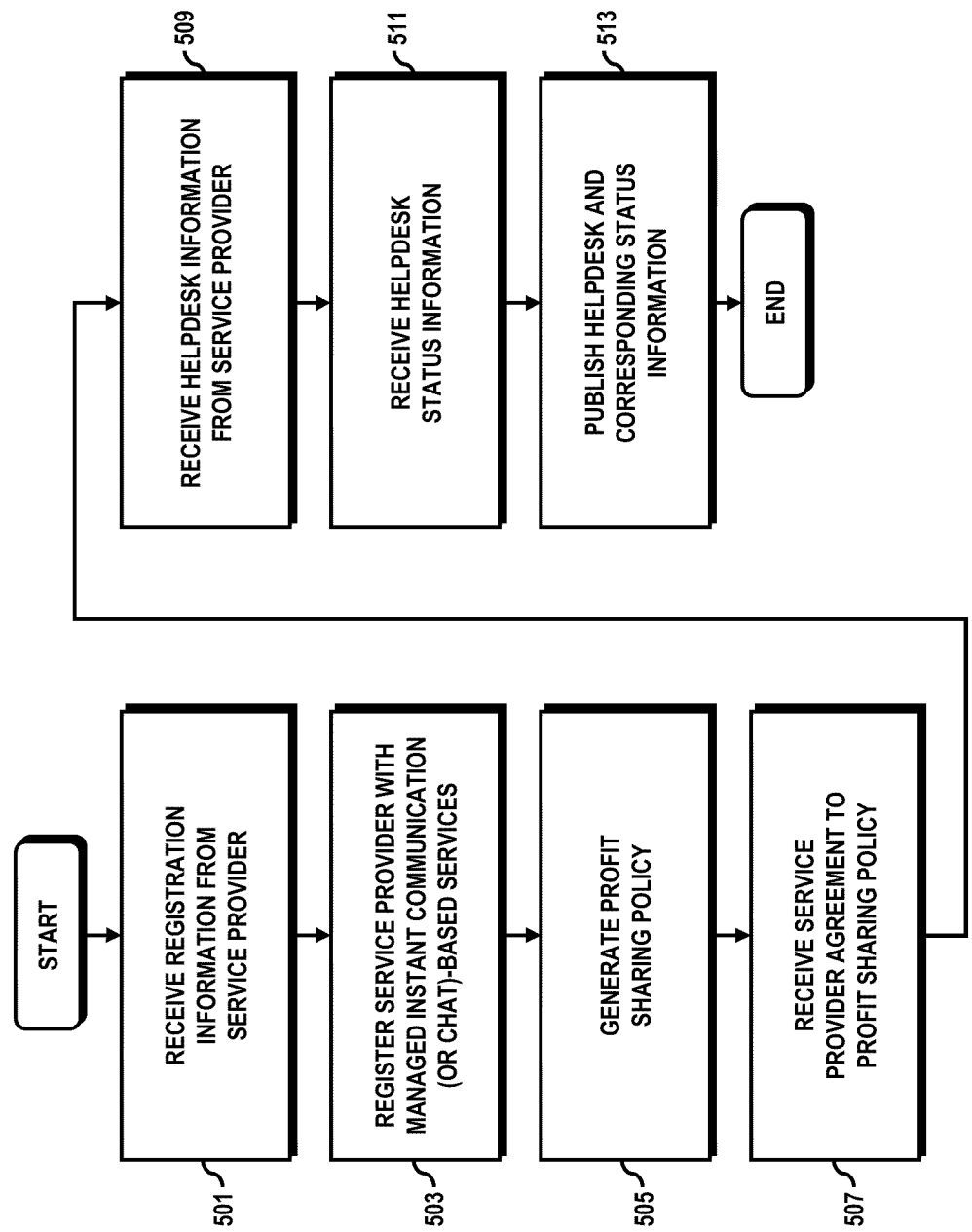
FIG. 5 is a flowchart of a process for registering a service provider to the managed instant communication (or chat)-based services, according to an exemplary embodiment.

As previously mentioned, platform 101 enables service providers to register with the managed instant communication (or chat)-based services of system 100. FIG. 5 is a flowchart of a process for registering a service provider to the managed instant communication (or chat)-based service, according to an exemplary embodiment. For illustrative purposes, the process is described with reference to FIG. 1. It is also noted that the steps of the process may be performed in any suitable order, as well as combined or separated in any suitable manner. At step 501, platform 101 receives registration information from a service provider via, for example, publication and discovery system 121. That is, an administrator, for example, may access platform 101 via one or more portlet applications of portal 109 that, in turn, are made available to the service provider via, for instance, browser application 111 executing on (or made accessible to) a corresponding user device, e.g., user device 107b. To this end, the service provider may be provided access to one or more GUIs and associated interface tools (e.g., menus, options, selections, widgets, etc.) for passing registration information to platform 101 that, in exemplary embodiments, may correspond to standard enterprise profile information, e.g., name, objective, history, headquarters, management personnel, employees, locations, units (or divisions), revenue, clients (or customers), partners, awards, etc. It is noted that system 121 may store this registration information to any suitable storage location of (or accessible to) system 100, such as service provider information repository 127.

Utilizing the registration information, system 121 may preliminarily register the service provider to the managed instant communication-based helpdesk services of system 100, per step 503. In certain embodiments, system 121 may provide one or more usernames and passwords to the administrator to enable one or more individuals associated with the service provider to access and utilize the features and functionality of platform 101.

According to exemplary embodiments, management logic 117 generates, in step 505, a profit sharing policy (or contract) that the service provider may rely on and, in turn, be required to adhere to. The policy may specify one or more associated cost structures, profit sharing models, established groups of service providers, participation requirements, responsibilities, etc., of registered service providers, as well as expound upon the various management, monitoring, operation, publication, and updating services provided by platform 101. In certain exemplary embodiments, management logic 117 may be configured to cause one or more "hardcopies" or "softcopies" of these policies, contracts, etc., to be transmitted to the service provider for physical and/or electronic approval (e.g., signatory approval, etc.). As such, platform 101 may provide the policies, contracts, etc., via download, electronic mail, facsimile, instant message, postal mail, or any other suitable mode of communication. Thus, in step 507, platform 101 may receive agreement to the profit sharing policy (or contract) from the service provider in the form of, for example, a virtual or physical signature.

Upon acceptance of the profit sharing policy, the service provider will be officially registered for the managed instant communication-based helpdesk services of system 100. In this manner, system 121 may receive, in step 509, more detailed helpdesk information from the service provider for linking one or more helpdesks associated with the service provider to helpdesk network 103. In exemplary embodiments, the helpdesk information may relate to information, such as acceptable forms of customers (e.g., common customers, enterprise customers, etc.), categories of service (e.g., health, technology, finance, transportation, etc.), description of service provider (e.g., individual, business, organization, institution, non-profit, etc.), description of services (e.g., summaries, blurbs, advertisements, etc.), modes of communication (e.g., electronic mail, instant communication, live chat, virtual chat, mobile chat, telephony, etc.), guides for utilizing the customer support services associated with various helpdesks, network address (e.g., machine access control addresses, firewall information, internet protocol addressing, subnet addressing, etc.), rates of service (e.g., capacity of customers capable of being serviced), and scheduling (e.g., helpdesk hours of operation, agent hours, number of available agents, simultaneous chat capabilities, etc.), as well as any other suitable information associated with helpdesks. System 121 may store this helpdesk information to any suitable storage location of (or accessible to) system 100, such as helpdesk information repository 129. At step 511, monitoring system 123 may monitor and, thereby, receive status information (e.g., helpdesk availability, agent availability, agent presence information, scheduling information, etc.) associated with the one or more helpdesks of the registered service provider. Thus, per step 513, system 121 can publish (e.g., advertise and make the one or more helpdesks available to customers for searching and connecting via portal 109 and/or platform 101) the one or more helpdesks of the registered service provider along with the status information associated therewith. In exemplary embodiments, system 121 may also publish rating and/or survey information, which may be provided by the registered service provider, feedback system (or system) 125, or any suitable third party service. It is noted that the publication of this rating and/or survey information may facilitate customer efforts to reasonably judge and efficiently choose from available helpdesks. As such, system 125 may store this feedback information to any suitable storage location or memory of (or accessible to) system 100, such as feedback information repository 131.

Figure 6:
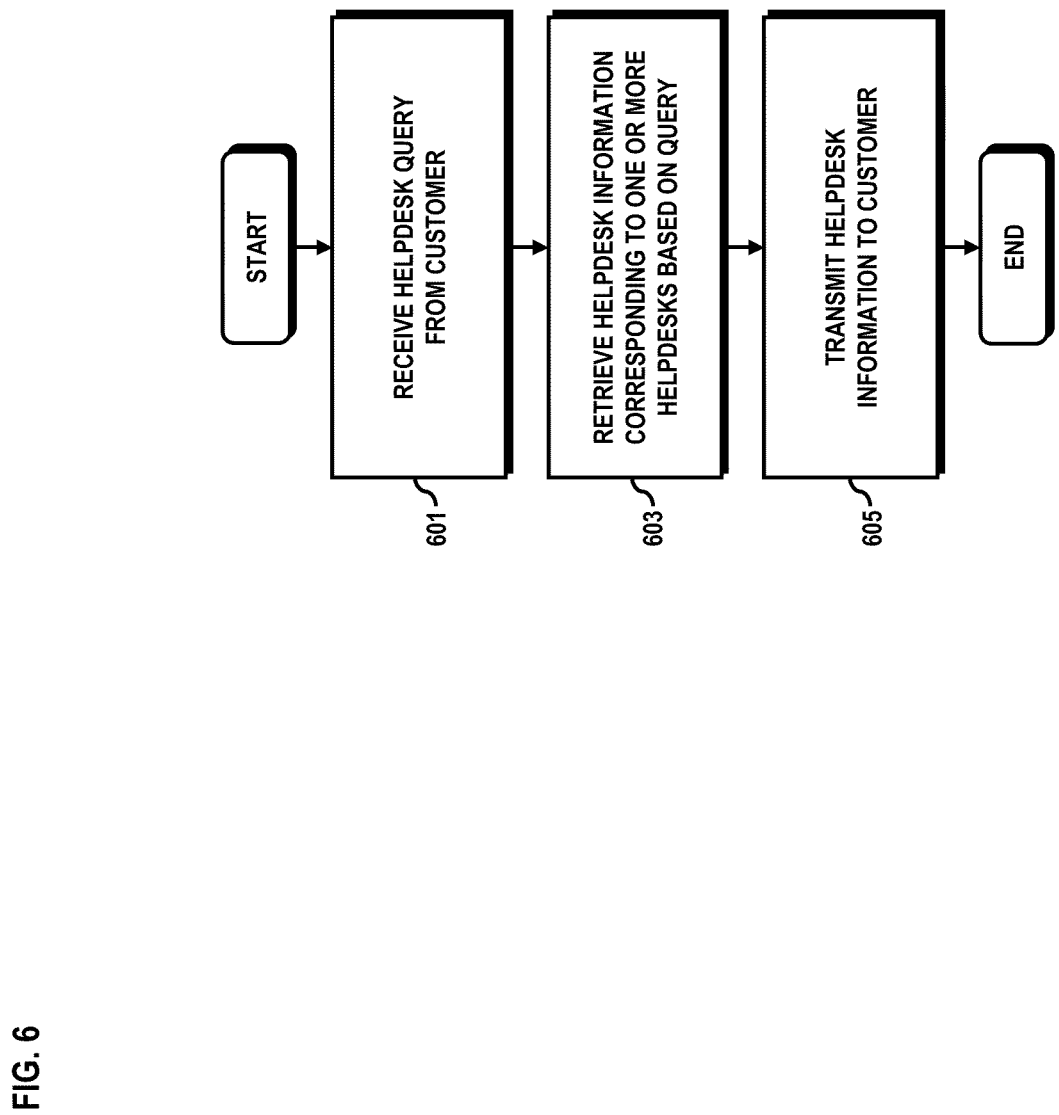
FIG. 6 is a flowchart of a process for transmitting helpdesk information to customers, according to an exemplary embodiment.

FIG. 6 is a flowchart of a process for transmitting helpdesk information to customers, according to an exemplary embodiment. For illustrative purposes, the process is described with reference to FIG. 1. Although the process is described with respect to responding to helpdesk queries, it is noted that the process is also applicable to dynamic customer "browsing" for available helpdesks and/or helpdesk services, wherein one or more browsing criteria may be utilized to filter a list of available helpdesks to be "browsed." It is also noted that the steps of the process may be performed in any suitable order, as well as combined or separated in any suitable manner. In step 601, platform 101 receives at, for example, system 121 a query from a customer searching for one or more helpdesks that may facilitate the customer in resolving their support issue(s). According to exemplary embodiments, customers (via one or more user devices 107a-107n) may formulate queries and receive responses from platform 101 via one or more portlets of portal 109, that may be accessed via browser application 113. In this manner, portal 109 may provide one or more networked interfaces for customers to search for helpdesks based on any number of criteria, such as criteria corresponding to the aforementioned business information, service provider information, helpdesk information, threshold values, etc. For example, the criteria may relate to keywords, status information, service type, service provider type, ratings or feedback information, costs, and location (or position). As such, formulated queries may include one or more of these criteria. At step 603, system 121 retrieves, based on the query and/or criteria, helpdesk information corresponding to one or more of the helpdesks of helpdesk network 103. In exemplary embodiments, the helpdesk information may be retrieved from any suitable storage location or memory associated with (or otherwise accessible to) system 100, such as helpdesk information repository 129. Additionally (or alternatively), helpdesk information may be retrieved from helpdesk information repositories (not shown) associated with individual helpdesks or networked helpdesks not otherwise associated with helpdesk network 103. It is noted that the integration of this additional information is seamless to the customer. Namely, this additional information may be provided (e.g., presented) to the customer in such a manner that the customer believes the helpdesk information, and associated helpdesks, to be a part of helpdesk network 103. To this end, the retrieved helpdesk information may be transmitted to the customer, per step 605. As previously mentioned, this helpdesk information may be presented (e.g., displayed) to the customer via the one or more portlets of portal 109. It is noted that the helpdesks information may include one or more interactive GUI components (e.g., buttons, widgets, etc.) configured to launch instant communication application 113 for, at least, establishing instant communication (or chat)-based session with one or more helpdesks corresponding to the interactive GUI components.

Figure 7:
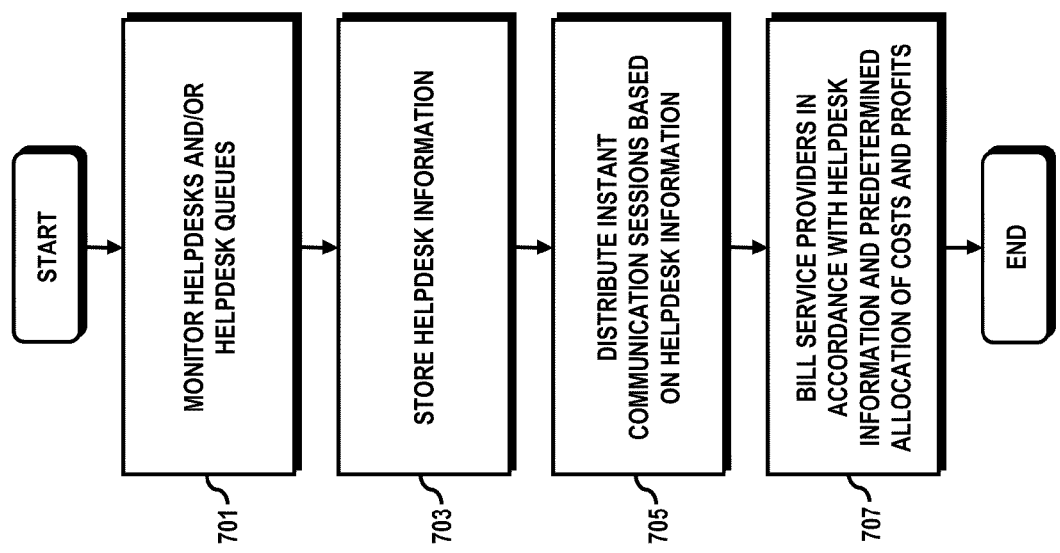
FIG. 7 is a flowchart of a process for monitoring one or more helpdesks and/or helpdesk queues, according to an exemplary embodiment.

FIG. 7 is a flowchart of a process for monitoring one or more helpdesks and/or helpdesk queues, according to an exemplary embodiment. For illustrative purposes, the process is described with reference to FIG. 1. It is also noted that the steps of the process may be performed in any suitable order, as well as combined or separated in any suitable manner. At step 701, helpdesk platform 101 via, for example, monitoring system 123 monitors helpdesks associated with helpdesk network 103, as well as helpdesk queues 119 associated therewith according to one or more of the aforementioned forms of helpdesk information. It is also noted that monitoring system 123 may monitor one or more stores of service provider information associated with the helpdesks of helpdesk network 103. In step 703, monitoring system 123 stores monitored helpdesk information to, for example, helpdesk information repository 129 or any other suitable storage location or memory of (or accessible to) system 100, such as service provider information repository 127. In this manner, publication and discovery system 121 can dynamically update the publication of the helpdesks of helpdesk network 103 based on information provided by monitoring system 123. Per step 705, management logic 117 and instant communication module 115 utilize the helpdesk information to establish, distribute and, when necessary, redistribute instant communication sessions amongst available helpdesks of helpdesk network 103 and associated helpdesk queues 119. In step 707, management logic 117 may also utilize the helpdesks information (e.g., utilization of the manage instant communication (or chat)-based helpdesk services of system 100) in order to bill service providers in accordance with the aforementioned profit sharing policy, e.g., predetermined allocation of costs and profits amongst helpdesk service providers.

Figure 8:
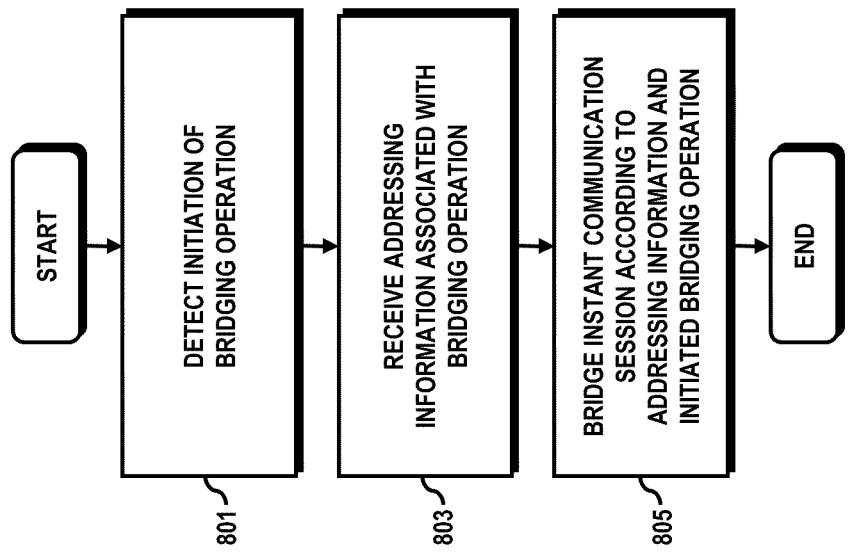
FIG. 8 is a flowchart of a process for bridging instant communication sessions, according to an exemplary embodiment.

FIG. 8 is a flowchart of a process for bridging instant communication sessions, according to an exemplary embodiment. For illustrative purposes, the process is described with reference to FIG. 1. It is noted that exemplary GUIs for effectuating user initiated bridging operations are described in association with FIGS. 9A-9C. It is also noted that the steps of the process may be performed in any suitable order, as well as combined or separated in any suitable manner. At step 801, instant communication module 115 detects initiation of an instant communication (or chat)-based bridging operation. According to various exemplary embodiments, bridging operations may be initiated by agents and customers, as well as instigated based on one or more commands (or instructions) provided to instant communication module 115 by management logic 117 and/or one or more of systems 121 or 123. For example, agents may initiate bridging operations to transfer instant communication sessions to one or more other helpdesks or one or more other agents that may be associated with a same helpdesk as the agent initiating the transfer or another helpdesk of helpdesk network 103. In other instances, agents may initiate bridging operations to conference one or more other agents (either associated with a same helpdesk as the agent initiating the conference or another helpdesk of helpdesk network 103) in on an established instant communication session. To this effect, customers may be provided with similar functionality to transfer or conference the instant communication session between other (or additional) helpdesks and/or agents. It is noted that system 121 may instigate bridging operations based on selection of a particular helpdesk, such as described in conjunction with FIG. 3. Management logic 117 and/or monitoring system 123 may cause one or more bridging operations to be performed based on the state of one or more queues (e.g., helpdesk queues 119) associated with the helpdesks of helpdesk network 103, such as explained in connection with FIG. 7. In any event, however, instant communication module 115 may receive, per step 803, addressing information associated with the initiated bridging operation, such as addressing information specifying one or more other helpdesks and/or agents to transfer the instant communication session to or conference in. Thus, in step 805, instant communication module 115 bridges the instant communication session based on the addressing information and initiated bridging operation.

Figure 9A:
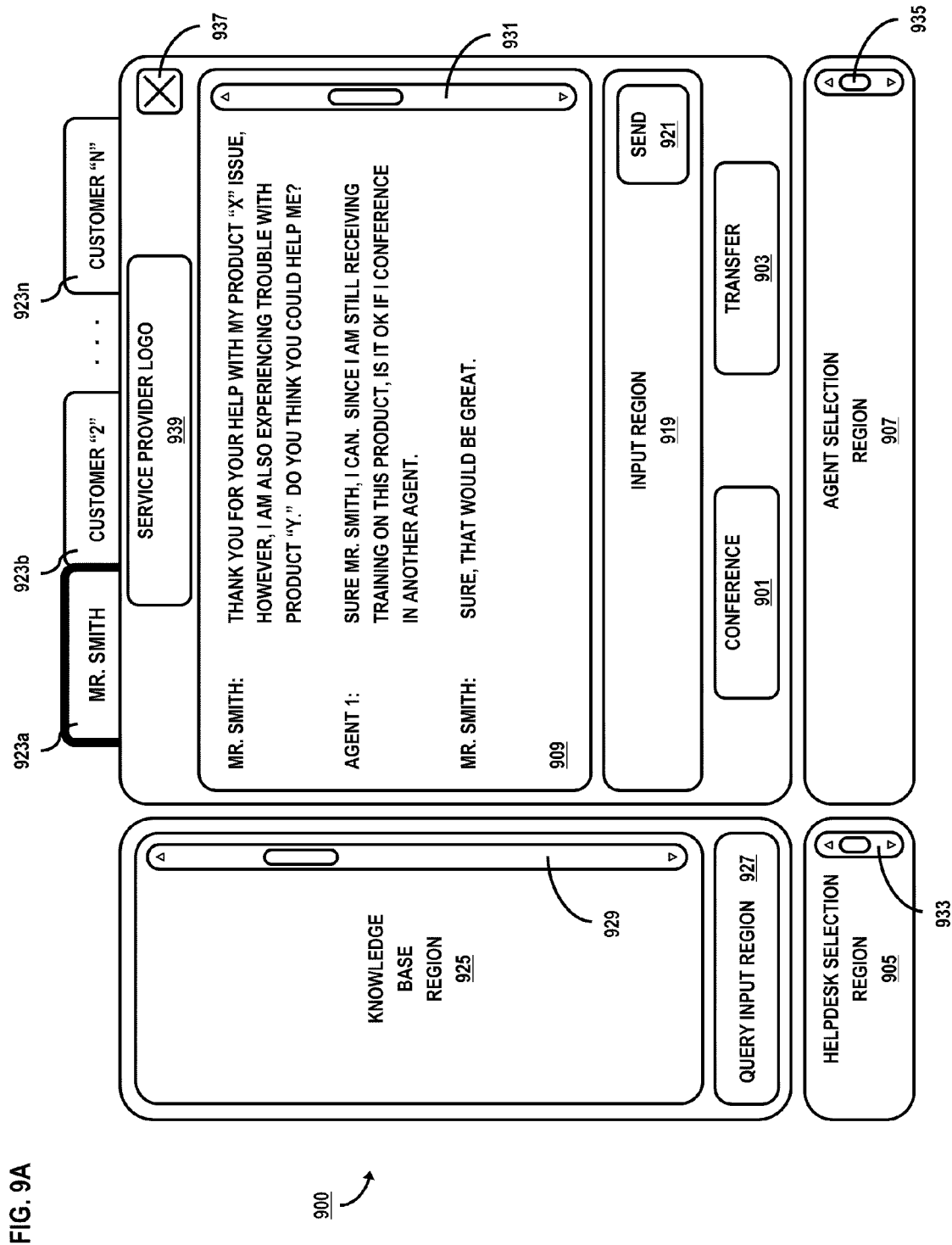
FIGS. 9A-9C are diagrams of graphical user interfaces for providing instant communication (or chat)-based user interfaces, according to an exemplary embodiment.
Figure 9B:
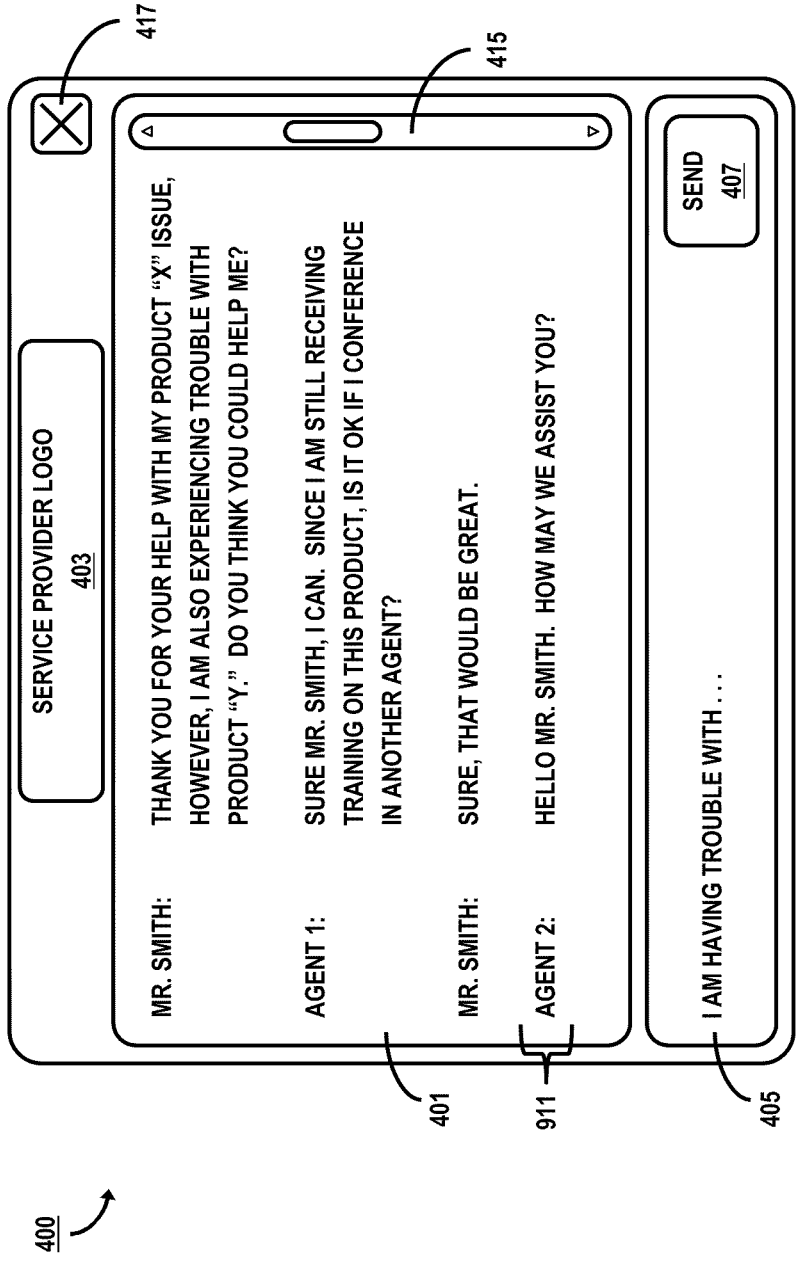
Figure 9C:
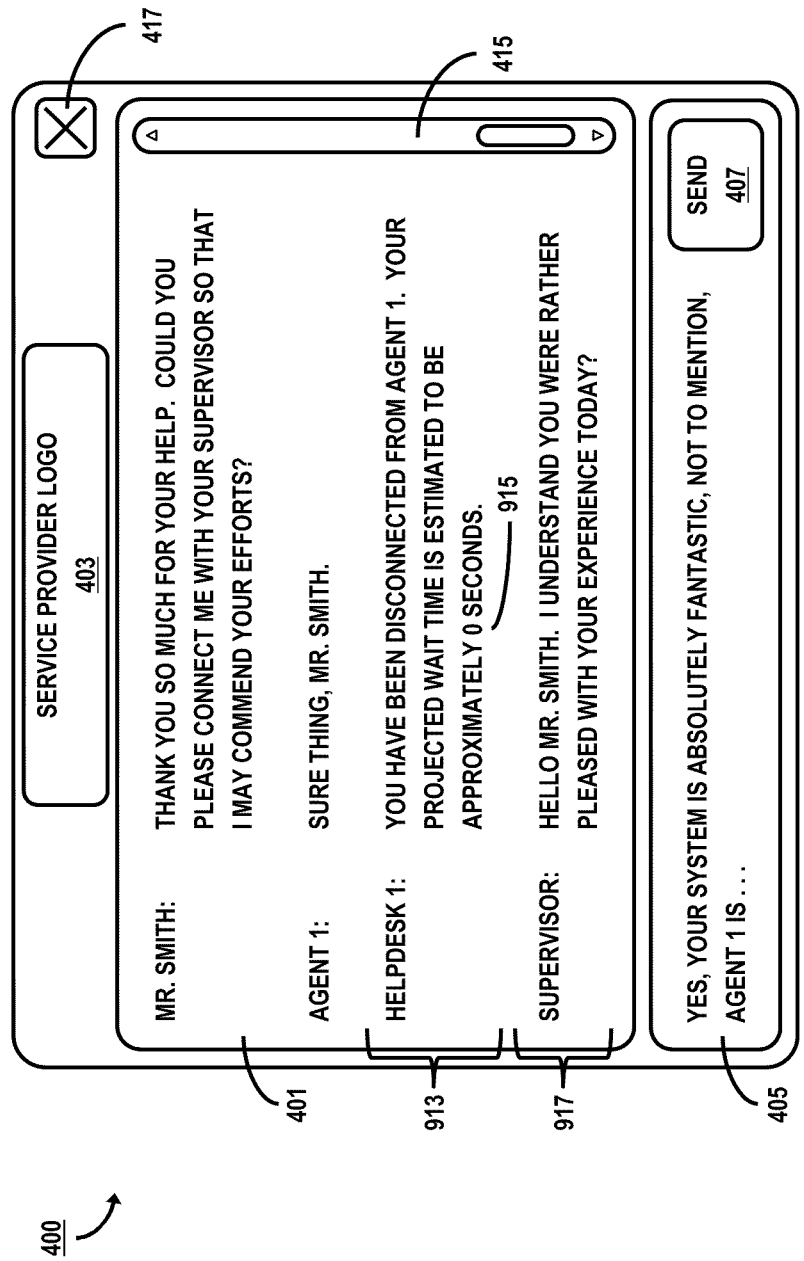

It is noted that agents may initiate instant communication-based bridging operations via one or more GUIs for providing instant communication (or chat)-based user interfaces to the agents. FIGS. 9A-9C are diagrams of graphical user interfaces for providing instant communication (or chat)-based user interfaces, according to exemplary embodiments. As seen in FIG. 9A, GUI 900 provides various interactive GUI components (e.g., buttons 901 and 903, as well as selection regions 905 and 907) for effectuating instant communication-based bridging operations. Namely, an agent may interact with conference button 901 to conference other agents into an established communication session. To this end, helpdesk selection region 905 and agent selection region 907 may be provided for selecting one or more agents of one or more helpdesks of helpdesk network 103 to conference into an established instant communication session, such as the instant communication session presented by region 909 configured to display a text dialogue between the customer, e.g., "MR. SMITH," and the agent, e.g., "AGENT 1." In the illustrated example, "AGENT 1" asks "MR. SMITH" if conferencing in another agent is acceptable, to which "MR. SMITH" replies in the affirmative. Utilizing interactive GUI components 901, 905, and/or 907, "AGENT 1" may conference "AGENT 2" into the established instant communication session of region 909. As seen in FIG. 9B, GUI 400 includes message 911 from "AGENT 2," thereby indicating that "AGENT 2" has been bridged into the instant communication session. Accordingly, each of the participants of the instant communication may communication with one another, such that the text dialogues of regions 401 and 909 may relate to one another.

Agents may also interact with transfer button 903 to transfer the instant communication session to other agents, such as agent supervisors (or supervisors). Referring also to FIG. 9C, "MR. SMITH" may request "AGENT 1" to transfer the instant communication session to a supervisor. Utilizing interactive GUI components 903, 905, and/or 907, "AGENT 1" may transfer the instant communication session to "SUPERVISOR 1." Since it may be the case that "SUPERVISOR 1" is "currently" unavailable, the instant communication session may be temporarily bridged between "HELPDESK 1" and "MR. SMITH." In such instances, notification message 913 may be provided to the customer to indicate that "AGENT 1" was disconnected from the instant communication session. Notification message 913 may also provide a projected wait time 915 indicating to the customer an estimated wait time before the instant communication session will be bridged between the customer and the supervisor. As such, "SUPERVISOR 1" may prompt the customer with message 917, e.g., "HELLO MR. SMITH. I UNDERSTAND YOU WERE RATHER PLEASED WITH YOUR EXPERIENCE TODAY?" and, thereby, indicating that the instant communication session was successfully transferred to "SUPERVISOR 1."

Before proceeding further, other aspects and components for providing instant communication (or chat)-based customer support sessions via GUI 900 are described. For instance, like GUI 400, GUI 900 may include input region 919 to enable agents to input text to GUI 900, as well as incorporate send button 921 for transmitting input text to corresponding participants of an "active" instant communication session. In this manner, GUI 900 may include one or more interactive GUI elements 923a, 923b, . . . , 923n to enable agents to toggle between simultaneously supported instant communication sessions, whereby the "active" instant communication session being presented in region 909 can be indicated to agents via one or more focusing features (such as one or more bolding, magnification, coloring, etc., features) of elements 923a-923n. In the illustrated example, element 923a has been interacted with, such that the instant communication session of region 909 corresponds to the instant communication session bridged between "AGENT 1" and "MR. SMITH." To enable agents to efficiently search for solutions to customer issues, GUI 900 provides knowledge base region 925 and query input region 927. That is, agents may formulate queries in query input region 925 and receive customer support knowledge within knowledge base region 925. According to exemplary embodiments, customer support knowledge may be retrieved from any suitable storage location or memory of (or accessible to) system 100, such as helpdesk information repository 129. In order to facilitate user friendliness, GUI 900 may also include one or more navigation elements (e.g., scroll bars 929, 931, 933, and 935) to permit agents to navigate to available, but not displayed information and/or GUI components. According to various other embodiments, GUI 900 may also incorporate one or more interactive elements for terminating instant communication sessions, such as button 937, as well as include service provider logo 939 indicating, for instance, the service provider of the managed instant communication (or chat)-based helpdesk services of system 100.

Figure 10:
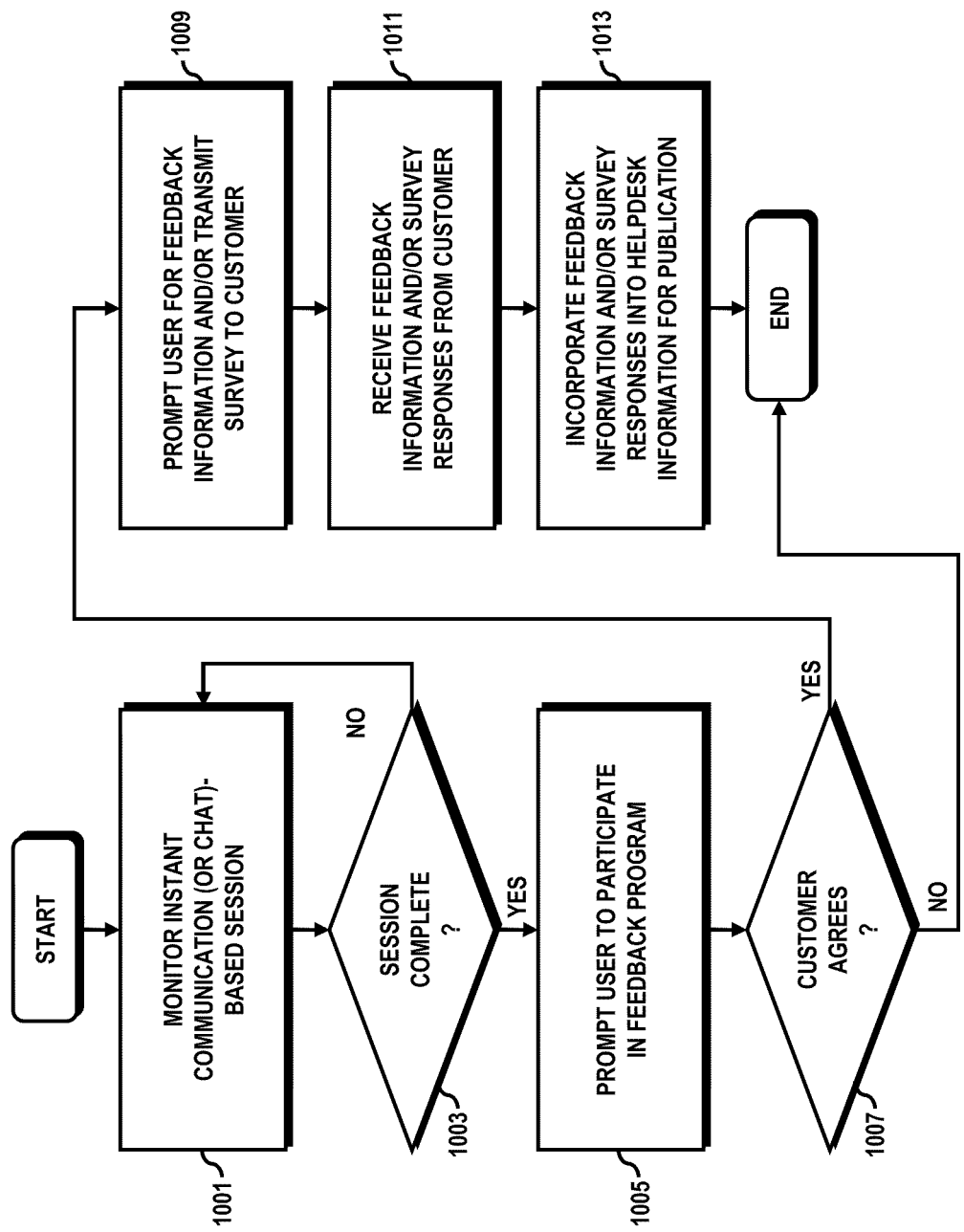
FIG. 10 is a flowchart of a process for acquiring and implementing feedback information, according to an exemplary embodiment.

FIG. 10 is a flowchart of a process for acquiring and implementing feedback information, according to an exemplary embodiment. For illustrative purposes, the process is described with reference to FIG. 1. It is noted that the process assumes the existence of an established communication session, which may be bridged between a customer and one or more customer service agents. It is also noted that the steps of the process may be performed in any suitable order, as well as combined or separated in any suitable manner. At step 1001, monitoring system 123 monitors the established instant communication (or chat)-based customer support session. In step 1003, system 123 determines whether the session is complete, e.g., terminated. According to certain exemplary embodiments, interaction with one or more of buttons 417 and 937, signals to system 123 that an instant communication session is complete. If the instant communication session is complete, then feedback system 125 may prompt, per step 1005, the user to participate in one or more feedback programs, such as participate in one or more rating or survey questionnaires. It is noted that the prompting by system 125 may be presented to customers before instant communication application 113 closes GUI 400, such that the prompting by system 125 is formulated via text message. According to other embodiments, feedback system 125 may solicit participation via one or more other modes of communication, such as via electronic mail, facsimile, telephony call, etc. If the customer agrees to participate, per step 1007, system 125 may prompt the user, at step 1009, for feedback information and/or transmit one or more surveys to the customer for eliciting from the customer, feedback information corresponding to the customer's satisfaction with their customer support experience. As such, system 125 receives, in step 1011, feedback information and/or survey responses from the customer. Per step 1013, feedback system 125 may parse through (or otherwise analyze) the feedback information and/or survey responses to incorporate these forms of information into helpdesk information for publication to and/or discovery by customers.

The processes described herein for providing managed instant communication (or chat)-based helpdesk services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
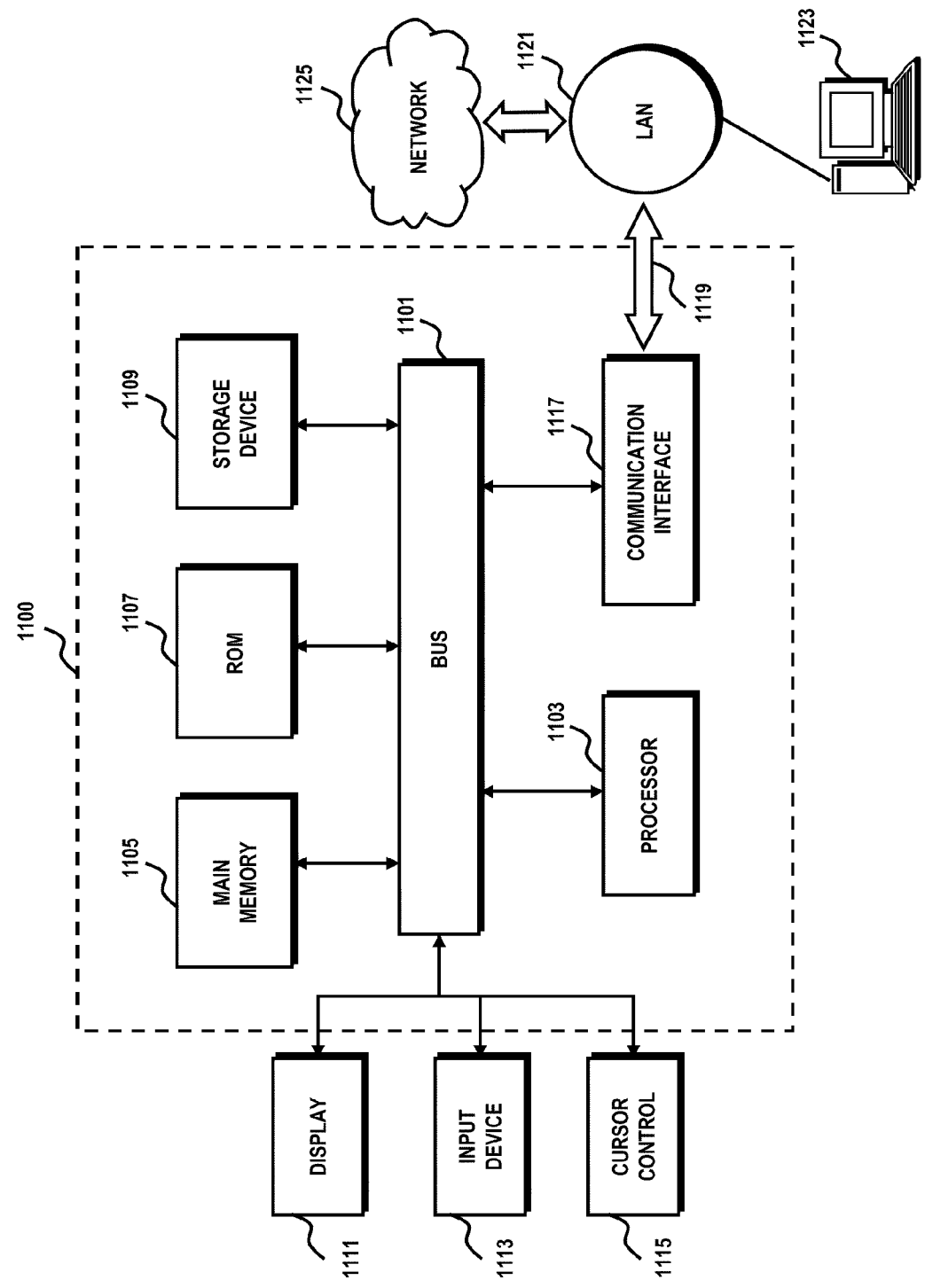
FIG. 11 is a diagram of a computer system that can be used to implement various exemplary embodiments.

FIG. 11 illustrates computing hardware (e.g., computer system) 1100 upon which an embodiment according to the invention can be implemented. The computer system 1100 includes a bus 1101 or other communication mechanism for communicating information and a processor 1103 coupled to the bus 1101 for processing information. The computer system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to an embodiment of the invention, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. Thus, embodiments of the invention are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an embodiment of the invention through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   aggregating, via a helpdesk management platform, a plurality of helpdesk networks comprising a plurality of helpdesk service providers serving a plurality of enterprises that provide services, products, and information to a plurality of market sectors, wherein the aggregating includes receiving a service provider registration information and a helpdesk information from each of the plurality of helpdesk service providers;
   receiving, at the helpdesk management platform, an inquiry for a support service from a customer requesting assistance, the support service being associated with an enterprise of the plurality of enterprises, the inquiry including one or more parameters defining the support service;
   generating, via at least one processor of the helpdesk management platform, a response to the inquiry based on the one or more parameters, the response indicating a plurality of helpdesks associated with a group of helpdesk service providers serving the enterprise based on a profit sharing policy of the group for sharing profits amongst the plurality of helpdesk service providers;
   establishing, via the at least one processor, an instant communication session between the customer and one of the plurality of helpdesks; and
   placing, via the at least one processor, the instant communication session into a queue for an agent, the agent being associated with the one helpdesk.

2. A method according to claim 1, further comprising:
   initiating, via the at least one processor, a presentation on a user interface of a web portal for access control and one or more helpdesk management operations; and
   receiving, via the user interface, a selection of the one helpdesk based on one or more selection criteria,
   wherein the web portal is customized for the enterprise, the one helpdesk, the agent, or a combination thereof, and
   wherein the user interface is available for one or more administrators of the group of the helpdesk service providers, one or more helpdesk service agents of the group of the helpdesk service providers, the customer, or a combination thereof.

3. A method according to claim 2, wherein the selection is performed by the customer.

4. A method according to claim 2, wherein the selection is performed by management logic based on the one or more parameters together with the one or more selection criteria.

5. A method according to claim 1, further comprising:
   determining, via the at least one processor, availabilities for the plurality of helpdesks,
   wherein placing the instant communication session into the queue is based on the availabilities of the plurality of helpdesks and one or more predefined thresholds, and
   wherein the helpdesk management platform physically and logically aggregates the plurality of helpdesk networks.

6. A method according to claim 1, further comprising:
   placing, via the at least one processor, the instant communication session into another queue based on a fixed or variable ratio proportional to capacity of the queue and the another queue,
   wherein capacity is defined as a product between a total number of agents associated with the helpdesk and a number of instant communication sessions being concurrently handled by the total number of agents, wherein the one or more parameters defining the support service include threshold customer feedback information, real-time threshold helpdesk status information, threshold cost parameters, a business flow of a web portal from which the customer initiates the query, one or more questions answered by the customer during previous helpdesk inquiry processes, or a combination thereof.

7. A method according to claim 1, further comprising:
bridging the instant communication session between the customer and the agent; and
transferring the instant communication session to another agent either associated with the one helpdesk or another one of the helpdesks.

8. A method according to claim 1, further comprising:
bridging the instant communication session between the customer, the agent, and at least one other agent either associated with the one helpdesk or another one of the helpdesks.

9. A method according to claim 1, further comprising:
monitoring, via the at least one processor, the queue according to one or more bandwidth metrics, one or more congestion metrics, one or more throughput metrics, one or more latency metrics, or a combination thereof associated with service level agreements corresponding to the enterprises and the plurality of helpdesk service providers; and
placing, via the at least one processor, the instant communication session into at least one other queue wherein at least one of the metrics satisfies one or more predefined thresholds,
wherein the at least one other queue is ordered among a plurality of overflow queues.

10. A method according to claim 1, further comprising:
publishing, via the at least one processor, helpdesks of the plurality of helpdesk networks with availability status information as part of a managed helpdesk service to a plurality of customers including the customer,
wherein the plurality of helpdesk service providers register with the managed helpdesk service and provide helpdesk services for the enterprises to the customers.

11. A method according to claim 10, wherein the plurality of helpdesk service providers are assigned to a plurality of policies as part of registering with the managed helpdesk service.

12. A method according to claim 1, further comprising:
prompting the customer, via the at least one processor, for feedback information corresponding to satisfaction with helpdesk service experience,
wherein the feedback information is included as part of a response to a subsequent inquiry for a support service.

13. An apparatus comprising:
a communication interface configured to receive an inquiry for a support service from a customer requesting assistance, the inquiry including one or more parameters defining the support service associated with an enterprise of a plurality of enterprises that provide services, products, and information to a plurality of market sectors; and
a processor configured to aggregate a plurality of helpdesk networks comprising a plurality of helpdesk service providers serving the plurality of enterprises, wherein the processor is further configured to receive a service provider registration information and a helpdesk information from each of the plurality of helpdesk service providers, and to generate a response to the inquiry based on the one or more parameters, the response indicating a plurality of helpdesks associated with a group of helpdesk service providers serving the enterprise based on a profit sharing policy of the group for sharing profits amongst the plurality of helpdesk service providers,
wherein the communication interface is further configured to establish an instant communication session between the customer and one of the plurality of helpdesks, and the processor is further configured to place the instant communication session into a queue for an agent, the agent being associated with the one helpdesk.

14. An apparatus according to claim 13, wherein the one helpdesk is selected from the plurality of helpdesks based on one or more selection criteria.

15. An apparatus according to claim 13, wherein the processor is further configured to determine availabilities for the plurality of helpdesks and place the instant communication session into the queue based on the availabilities of the plurality of helpdesks and one or more predefined thresholds.

16. An apparatus according to claim 13, wherein the processor is further configured to place the instant communication session into another queue based on a fixed or variable ratio proportional to capacity of the queue and the other queue, capacity being defined as a product of a total number of agents associated with the helpdesk and a number of instant communication sessions being concurrently handled by the total number of agents.

17. An apparatus according to claim 13, wherein the communication interface is further configured to bridge the instant communication session between the customer and the agent, and transfer the instant communication session to another agent either associated with the one helpdesk or another one of the helpdesks.

18. An apparatus according to claim 13, wherein the communication interface is further configured to bridge the instant communication session between the customer, the agent, and at least one other agent either associated with the one helpdesk or another one of the helpdesks.

19. An apparatus according to claim 13, further comprising:
a monitoring module configured to monitor the queue according to workforce information characterizing the one helpdesk and a plurality of agents associated with the one helpdesk,
wherein the processor is further configured to place the instant communication session into at least one other queue if the workforce information satisfies one or more predefined thresholds, the at least one other queue being ordered among a plurality of overflow queues.

20. An apparatus according to claim 13, further comprising:
a publication module configured to publish helpdesks of the plurality of helpdesk networks with availability status information as part of a managed helpdesk service to a plurality of customers including the customer,
wherein the plurality of helpdesk service providers register with the managed helpdesk service and provide helpdesk services for the enterprises to the customers.

21. An apparatus according to claim 20, wherein the plurality of helpdesk service providers are assigned to a plurality of policies as part of registering with the managed helpdesk service.

22. An apparatus according to claim 13, further comprising:
   a feedback module configured to prompt the customer for feedback information corresponding to satisfaction with helpdesk service experience,
   wherein the feedback information is included as part of a response to a subsequent inquiry for a support service.

\* \* \* \* \*